United States Patent [19]

Matsuda et al.

[11] 3,904,555

[45] Sept. 9, 1975

[54] WELDABLE PAINT COMPOSITION

[75] Inventors: Shozo Matsuda, Tokyo; Tadashi Tanaka; Akira Okamoto, both of Yokohama, all of Japan

[73] Assignee: Nippon Steel Corporation, Tokyo, Japan

[22] Filed: Oct. 5, 1972

[21] Appl. No.: 295,199

[52] U.S. Cl. .............. 252/503; 117/226; 117/227; 117/232; 252/512; 252/513; 252/514
[51] Int. Cl. ............................................. H01b 1/00
[58] Field of Search .......... 252/512, 513, 514, 503; 117/227, 226, 232; 106/290; 29/192 R

[56] References Cited

UNITED STATES PATENTS

| | | | |
|---|---|---|---|
| 2,280,135 | 4/1942 | Ward | 252/512 |
| 2,321,587 | 6/1943 | Davie et al. | 252/512 X |
| 3,099,578 | 7/1963 | Hunter | 252/503 X |
| 3,117,883 | 1/1964 | Gilchrist | 106/290 X |
| 3,173,885 | 3/1965 | Short | 117/227 X |
| 3,332,860 | 7/1967 | Diebold et al. | 117/227 |
| 3,410,722 | 11/1968 | Flanders et al. | 252/512 X |
| 3,484,284 | 12/1969 | Dates et al. | 117/227 X |
| 3,493,369 | 2/1970 | Busch et al. | 252/512 X |
| 3,503,882 | 3/1970 | Fitch | 106/290 X |
| 3,717,509 | 2/1973 | Palm et al. | 117/227 X |
| 3,719,610 | 3/1973 | Prentice | 252/513 |

FOREIGN PATENTS OR APPLICATIONS 431,641   7/1935   United Kingdom

*Primary Examiner*—Benjamin R. Padgett
*Assistant Examiner*—R. E. Schafer
*Attorney, Agent, or Firm*—Toren, McGeady and Stanger

[57] ABSTRACT

A weldable paint composition comprising a film forming resin and containing a hard metal, such as, Fe, Ni, Co, Cr, Mn and their alloys in powder form and a soft metal, such as, Al, Zn, Pb, Cu, Cd, Mg, Ag, Sn and their alloys in powder form and/or a soft metal equivalent substance, such as, graphite.

7 Claims, No Drawings

WELDABLE PAINT COMPOSITION

This invention relates to a weldable paint composition, and more particularly relates to a paint composition for coating to obtain a weldable paint coated steel surface for use in electrical-resistance welding processes.

In conventional press-forming and coating of a steel sheet, the following procedures are used:

1. press-forming → coating → joining (construction) or
2. press-forming → joining (construction) → coating.

In order to give complete air-tightness and excellent strength of the joints, an electrical-resistance welding process is usually used, but there are certain applications in which such a welding process is not suitable. For example, in the first process mentioned above, it is difficult to weld steel sheets coated with a paint which does not have sufficient conductivity. In the second process mentioned above, it is difficult to make a uniform coating on welded steel sheet products.

An object of the present invention is to provide a new weldable paint composition for coating steel sheets before the press-forming and welding steps.

A weldable paint containing conductive substances (generally, they are metals, aluminium paste, zinc powder and so on) is conventionally known.

In case of the conventional weldable-paint, the most suitable welding conditions depend on the composition of paint (the volume ratio of resins and metal). A prior publication teaches that the use of a paint containing 40 volume parts or more of metal powder per 100 volume parts of resin is needed to obtain sufficient weldability for coating on steel sheets. However, this paint has a defect that it has poor paint adhesion after forming, particularly after press-forming.

Table 1 shows results of the conventional paint.

Table 1

Relation between surface appearance and
Aluminium Content in the Aluminium-containing paint

| Al content* | Appearance of the Paint Film Surface |
|---|---|
| 62 | fairly good |
| 50 | good |
| 30 | excellent |

*The values mean volume part of Aluminium per 100 volume parts of Resin

As is clear from the above results, it is obvious that it is desirable to keep the content of the metal in the paint as low as possible.

The present invention provides a paint composition which gives weldability and good paint properties with the lowest possible content of metals.

The paint of this invention is composed of a resin for film forming and the following combinations of metals:

1. one or more metals in powder form, selected from the hard metal group consisting of Fe, Ni, Co, Cr, Mn and their alloys, and
    one or more metals in powder form selected from the electrically conductive soft metal group consisting of Al, Zn, Pb, Cu, Cd, Mg, Ag, Sn and their alloys or
2. one or more metals in powder form selected from the hard metal group consisting of Fe, Ni, Co, Cr, Mn and their alloys and
    soft-metal equivalent substance such as graphite.
3. one or more metals in powder form selected from the hard metal group consisting of Fe, Ni, Co, Cr, Mn and their alloys, one or more metals in powder form selected from the electrically conductive soft metal group consisting of Al, Zn, Pb, Cu, Cd, Mg, Ag, Sn and their alloys and
    a soft-metal equivalent substance, such as, graphite.

The mixing ratio of the resin and the metal powders is as follows:

More than 8 volume parts of the metal powder per 100 volume part of the resin. The soft metal and the soft-metal equivalent substance used in this invention means a conductive substance deformable plastically by the welding pressure (about 1,200 to 2,500 kg/cm$^2$) in resistant welding and the hard metals mean conductive substance which undergoes substantially no deformation plastically by the welding pressure (about 1,200 to 2,500 kg/cm$^2$).

In the conventional weldable paint, only a soft metal powder, such as, aluminium paste and zinc powder is used as the conductive substance. In such a case it is impossible to avoid the presence of the resin between the soft metal powder which should be in surface to surface contact when subjected to plastic deformation unless the metal is added in such a high amount that the film properties deteriorate.

The feature of the present invention resides in the addition of hard metal powders along with the soft metal powders. When the soft and hard metal powders coexist in the paint, electric conductivity is assured by contact between the metal particles.

It appears that the reason for this is that when the sheet steel coated with the present paint is welded, even if the resin is present between the metal particles, the hard metal particles break through the resin when welding pressure is applied, so that many spot contacts between at least the hard metal particles and many surface contacts between the hard and the soft metal particles are assured.

Consequently, the present paint coating has excellent electro resistance weldability in spite of very low metal powder content as compared with the conventional paint.

The present inventive paint will be compared with respect of spot weldability with a conventional weldable paint containing only aluminium paste.

Table 2

| Metal Powder Content* | Inventive** | Conventional |
|---|---|---|
| 62 | / | ⊚ |
| 50 | ⊚ | O |
| 30 | ⊚ | O ~ X |
| 17 | ⊚ | — |

*Volume part per 100 volume parts of resin
**Mixed with Fe-powder and Al-paste (1 : 1)
Remarks: ⊚: excellent, O: good, X: bad From these results, it is shown that the present inventive paint has excellent properties.

The addition of only hard metal powder instead of Al-paste, improves the weldability a little, but does not give the remarkable results obtained by the present paint.

A suitable mixing ratio of the hard metal powder to the soft metal powder and/or the soft metal equivalent substance is 1 : 4 to 4 : 1 in view of weldability and film quality.

The size of the metal powders does not affect weldability, but is preferable that the grain size is finer than 200 mesh.

The resin for the film formation may be selected optionally in connection with the upper coat since the present paint coating is used as precoating according to the procedure used.

In this invention, polyester, vinyl-acrylic, thermosetting acrylic resins, epoxy resin and so on may be used as the vehicle. These are mixed with the metal powders in any type of solvent paint, water soluble, or water dispersion paints. Plasticizers and/or organic pigments may be added to the paint composition in a suitable range, and the paint coating may be effected by a roller-coater, spraying and brushing.

The range of coating thickness is preferably between 8 – 20μ and the paint coating may be applied to steel sheets and strips and other plated or chemically treated metal sheets and strips.

The proportion of the metal powder to the resin may be changed depending on the metal sheet to be coated. For example, in case of a zinc-plated steel sheet, the content of the metal powder is more than 30 volume parts per hundred volume parts of the resin to improve the corrosion resistance. Further a protective pigment may be added.

Examples of the present invention will be set forth here under.

EXAMPLE 1 (spot welding)

The paint coating having the following composition was applied to 0.8 mm thick cold steel sheet.

| Polyester resin | | 100 | volume parts |
|---|---|---|---|
| Metal powders ( | Al powder | 25 | " |
| | Fe powder | 25 | " |
| Solvents and others | | 400 | " |

Welding was effected under the following conditions.

| | |
|---|---|
| spot welding pressure: | 300 kg/one spot |
| amount of current: | 8.0 KA/one spot |
| welding time: | 10 cycle |

The results showed a satisfactory welding was obtained.

EXAMPLE 2 (spot welding)

Paint coating of the following composition was applied to 0.8 mm thick cold steel sheet.

| Vinyl modified acryl resin | | 100 | volume parts |
|---|---|---|---|
| Metal powders ( | Zn powder | 15 | " |
| | Fe powder | 15 | " |
| Solvents and others | | 350 | " |

And welding was done under the following conditions:

| | |
|---|---|
| welding pressure: | 300 kg/one spot |
| current: | 7.5 – 8 KA/one spot |
| welding time: | 10 cycle |

The results showed spot welding was satisfactorily obtained.

EXAMPLE 3 (spot welding)

Paint coating of the following composition was applied to 0.8 mm thick cold steel sheet.

| Heat curable acrylic resin: | | 100 | volume parts |
|---|---|---|---|
| Metal powders ( | Al powder | 8 | " |
| | Fe powder | 8 | " |
| Solvents and others | | 300 | " |

Welding was done under the following conditions:

| | |
|---|---|
| welding pressure: | 300 kg/one spot |
| current: | 7.5 KA/one spot |
| welding time: | 10 cycle |

The results showed good spot welding.

EXAMPLE 4 (seam welding)

The paint coating of Example 2 or 3 was applied to 0.8 mm thick steel sheet and seam welding was effected under the following conditions:

| | |
|---|---|
| Welding pressure: | 400 kg |
| Current: | 15 KA |
| On-off cycle | 2 – 4 cycles |

The results showed good seam welding.

EXAMPLE 5

Paint coating of the following composition was applied to 0.8 mm thick cold steel sheet.

| Polyester resin: | | 100 | volume parts |
|---|---|---|---|
| Metal powders ( | Pb powder | 6 | " |
| | Fe powder | 6 | " |
| Solvents and others | | 400 | " |

Welding was done under the following conditions:

| | |
|---|---|
| welding pressure: | 300 kg/one spot |
| current: | 8 – 8.5 KA/one spot |
| welding time: | 10 cycle |

The results showed good spot welding.

EXAMPLE 6

Paint coating of the following composition was applied to 0.8 mm thick cold steel sheet.

| Epoxy resin: | | 100 | volume part |
|---|---|---|---|
| Metal powders ( | Al powder | 10 | " |
| | Fe powder | 20 | " |
| Corrosion-protective pigment (Zinc chromate) | | 4 | " |
| Solvents and others | | 300 | " |

Welding was effected under the following conditions:

| | |
|---|---|
| welding pressure: | 300 – 400 kg/one spot |
| current: | 7 – 8.0 KA/one spot |
| welding time: | 10 cycle |

The result showed very good weldability.

EXAMPLE 7

Various metal sheets were coated with the weldable paint of Example 1 and welding was done under the following conditions:

| | |
|---|---|
| Welding pressure: | 300 – 400 kg/one spot |
| Current: | 7 – 8.0 KA/one spot |
| Welding time: | 10 cycle |

The metal sheets coated in this example included a slightly Zinc-plated steel sheet (0.5 – 3g/m$^2$ plating) treated in organic chromate solution or inorganic chromate solution, electrically surface-treated steel sheets and phosphated Zinc-plated steel sheets.

The results were satisfactory.

EXAMPLE 8

An 0.65 mm thick Zinc-plated steel sheet (plating weight of 60 – 305g/m$^2$) was coated with a paint of the following composition:

| Epoxy resin: | | 100 | volume parts |
|---|---|---|---|
| Metal powders ( | Al powder | 20 | " |
| | Fe powder | 40 | " |
| Zinc chromate: | | 4 | " |
| Solvents and others: | | 300 | " |

Welding was done under the following conditions:

| | |
|---|---|
| welding pressure: | 300 – 400 kg/one spot |
| current: | 8 – 9 KA/one spot |
| welding time: | 8 – 10 cycle |

The results were very satisfactory.

EXAMPLE 9

An 0.8 mm thick tin-plated steel sheet was coated (plating weight: 80 – 100g/m$^2$) with the paint of Example 8 and welding was effected under the welding conditions of Example 8.

The results were satisfactory.

EXAMPLE 10

An 0.8 mm thick aluminium-plated steel sheet (plating weight: 130 – 170 g/m$^2$) was coated with the paint of Example 8 and welding was done under the welding conditions of Example 8.

The results showed good weldability.

What is claimed is:

1. In a weldable paint composition comprising a film forming resin and a conductive metal, the improvement wherein the metal comprises a mixture of a soft metal selected from the group consisting of Al, Zn, Pb, Cu, Cd, Mg, Ag, Sn, and alloys of said soft metals with each other; and a hard metal selected from the group consisting of Fe, Ni, Co, Cr, Mn, and alloys of said hard metals with each other; the ratio of hard metal to soft metal being from 1:4 to 4:1, and the particle size of the metal mixture being finer than 200 mesh, the mixture being suitable for application to steel prior to press forming and welding and being non-conductive and becoming conductive only when a pressure of 30 kg/cm$^2$ is applied thereto and providing good paint adhesion after welding.

2. A precoated metal sheet coated and baked with the weldable paint composition of claim 1 and having a dry paint film of 8 – 20$\mu$ thickness.

3. A precoated metal sheet according to claim 2 in which the base metal sheet is one selected from the group consisting of plated metal sheets, chromated metal sheet and chemically converted metal sheet.

4. The weldable paint of claim 1 wherein graphite is substituted for a portion of said soft metal.

5. The weldable paint composition of claim 4 in which the metal powder and the graphite are of spherical or jagged shape.

6. In a method for preparing a weldable paint coated steel surface wherein a coating composition is applied to the steel surface and the coated steel is baked, the improvement wherein the coating composition of claim 1 is used.

7. In a weldable paint composition comprising a film forming resin and a conductive metal, the improvement wherein the metal comprises a mixture of powdered graphite; and a hard metal selected from the group consisting of Fe, Ni, Co, Cr, Mn, and alloys of said hard metals with each other; the ratio of hard metal to graphite being from 1:4 to 4:1, and the particle size of the mixture being finer than 200 mesh, the mixture being suitable for application to steel prior to press forming and welding and being non-conductive and becoming conductive only when a pressure of 30 kg/cm$^2$ is applied thereto and providing good paint adhesion after welding.

* * * * *